Figure 1:
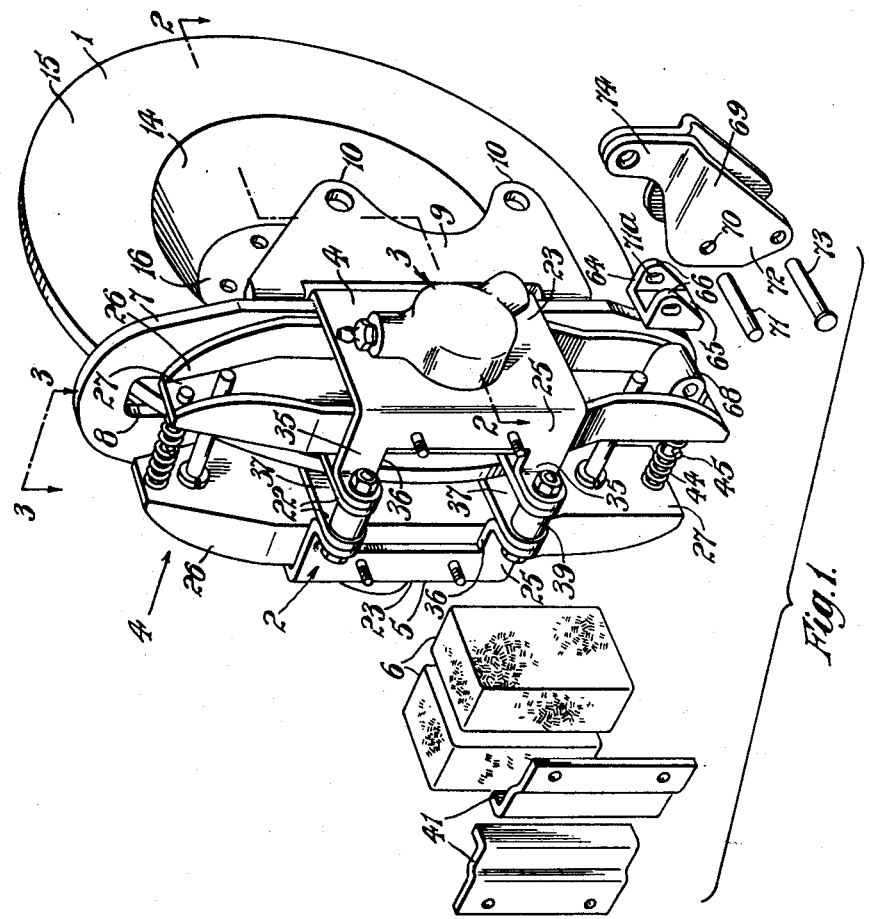

Aug. 9, 1960  H. J. BUTLER  2,948,356
DISC BRAKES AND AUTOMATIC ADJUSTING DEVICES THEREFOR
Filed March 28, 1958  4 Sheets-Sheet 1

INVENTOR
Henry James Butler
by Benj. T. Rauber
his attorney

Aug. 9, 1960  H. J. BUTLER  2,948,356
DISC BRAKES AND AUTOMATIC ADJUSTING DEVICES THEREFOR
Filed March 28, 1958  4 Sheets-Sheet 2

INVENTOR
Henry James Butler
by Benj. T. Rauber
his attorney

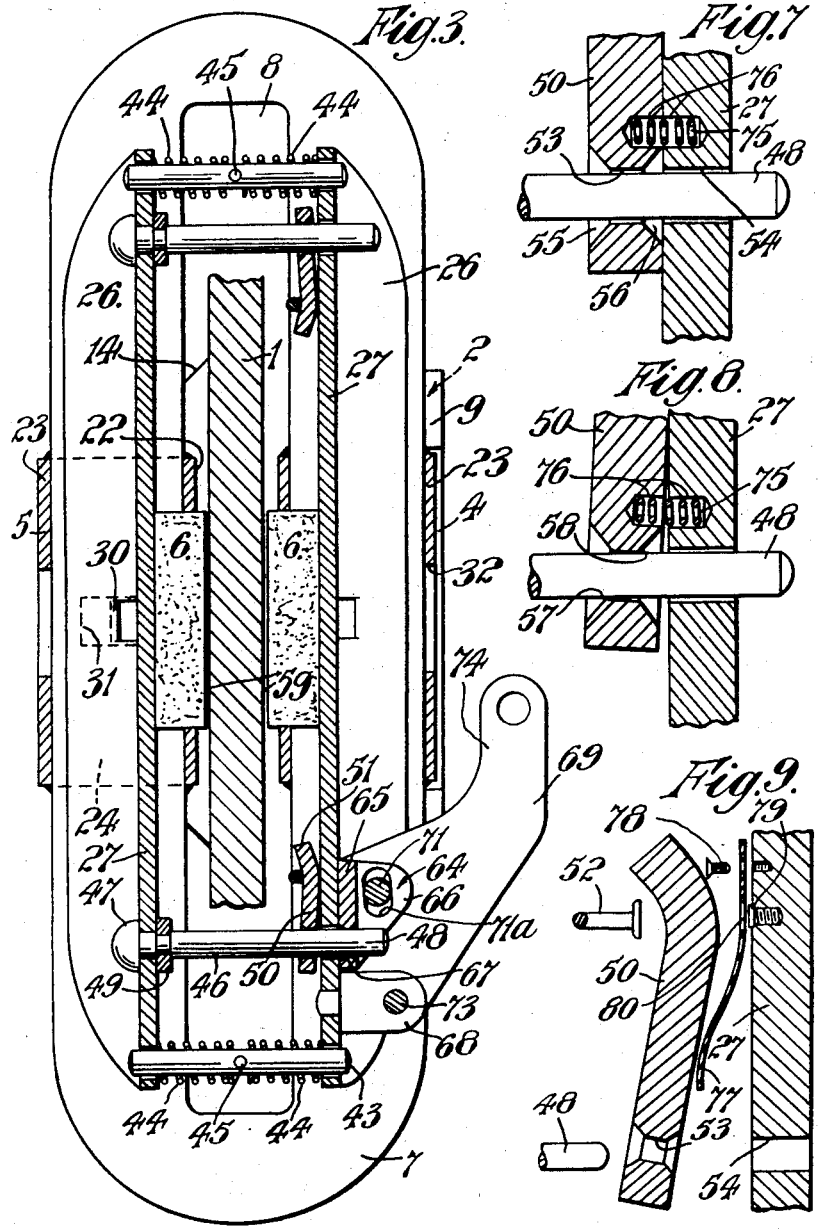

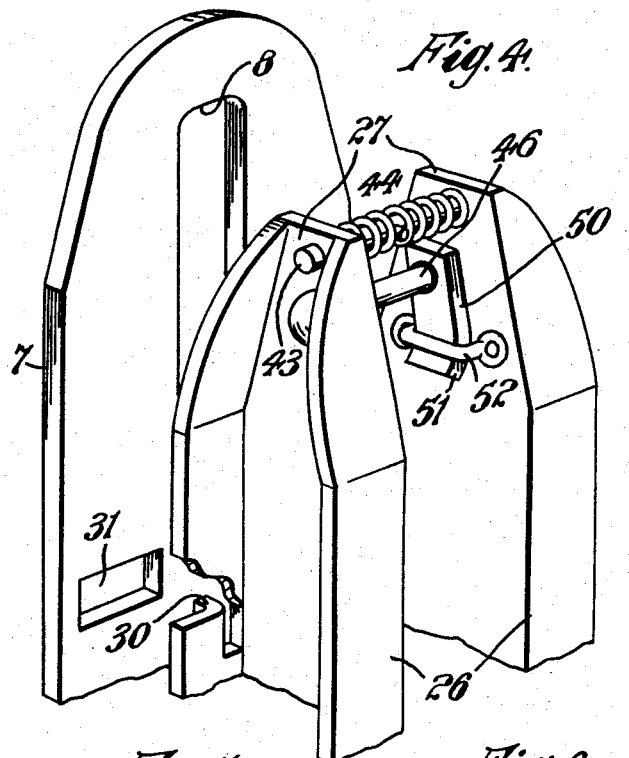
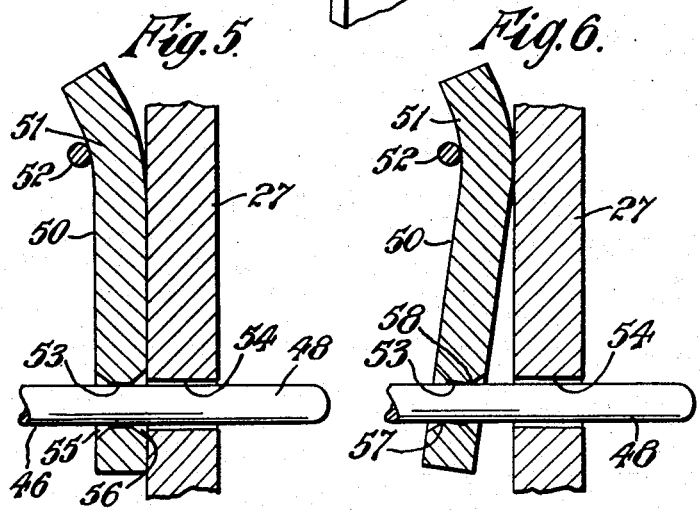

United States Patent Office 2,948,356
Patented Aug. 9, 1960

2,948,356

DISC BRAKES AND AUTOMATIC ADJUSTING DEVICES THEREFOR

Henry James Butler, Sutton Coldfield, England, assignor to Dunlop Rubber Company Limited, London, England, a British company Filed Mar. 28, 1958, Ser. No. 724,546

Claims priority, application Great Britain Apr. 3, 1957

16 Claims. (Cl. 188—73)

This invention relates to disc brakes and to automatic adjusting devices therefor and more particularly relates to an automatic adjusting device for a disc brake of the kind comprising a pair of friction pads each mounted on a backing plate and urged into frictional engagement with opposite faces of a rotatable disc by a mechanism, or mechanisms, mounted on a non-rotatable housing relative to which the backing plates are axially or substantially-axially movable.

An object of the present invention is to provide an improved automatic adjusting device for a disc brake of the above kind. A further object of the invention is to provide a disc brake in which such an automatic adjusting device is incorporated.

According to the invention, in a disc brake comprising a rotatable disc, non-rotatable pressure plates adapted to be moved towards said disc to press associated friction means into engagement therewith and means to effect movement of said pressure plates, an automatic adjusting device comprises a connecting member adapted to be secured to one of said pressure plates adjacent the periphery of said disc and to move freely through an aperture in the other said pressure plate, and means associated with said other pressure plate and with said connecting member to permit substantially free relative movement of said pressure plates towards said disc and movable into jamming engagement with said connecting member to restrict the relative movement of said pressure plates away from said disc.

Preferably the means movable into said jamming engagement comprise a metal tab pivoted to the pressure plate and provided with a hole through which the connecting means passes, the sides of the hole being shaped to provide a jamming engagement with the connecting means when the tab is in one angular position relative to the pressure plate, but allowing the connecting means to slide freely through the hole when the tab is in another angular position.

Preferably, also, the connecting means is a smooth cylindrical pin having an enlarged head at one end rigidly secured to one of the pressure plates.

According, also, to the invention a disc brake comprises a rotatable disc, a housing non-rotatably associated with said disc, a pair of pressure plates associated with said housing and located one on each side of said disc, a friction member associated with each said pressure plate, brake-applying means operable to move said pressure plates in said housing to force said friction members into frictional engagement with opposite sides of said disc, spring means to withdraw said pressure plates away from said disc upon release of said brake-applying means, a connecting member secured to one said pressure plate and connecting said pressure plates with relative movement therebetween and a tab member pivotally associated with the other of said pressure plates to permit unrestricted relative movement of said pressure plates towards said disc and to pivot and jam on said connecting member upon relative movement of said pressure plates away from said disc, whereby to limit the extent of the last-named said movement.

Figure 2:
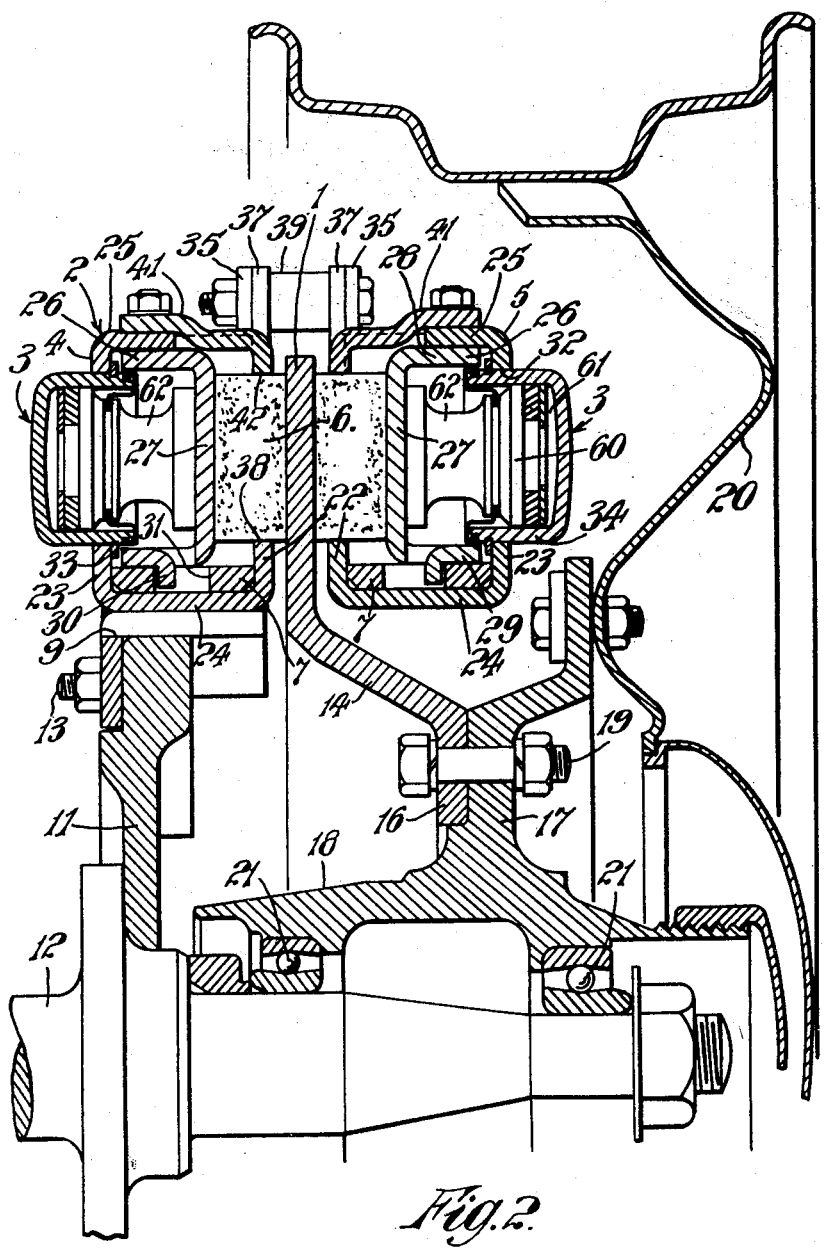

A better understanding of the invention may be obtained from the following description of one form thereof when this is read with reference to the accompanying drawings, of which:

Figure 1 is a perspective, partly exploded, view of a brake according to the invention, Figure 2 is a section on the line 2—2 of Figure 1, looking in the direction of the arrows thereon, with parts of the surrounding wheel, hub and axle structure shown, also in section, Figure 3 is a section of the line 3—3 of Figure 1, certain mechanism being omitted for the sake of clarity, Figure 4 is a perspective view of a portion of Figure 1 taken on the arrow 4 thereon, Figures 5 and 6 are greatly enlarged sections of a portion of Figure 3 showing details thereof in two different operational positions, Figures 7 and 8 are sections similar to Figures 5 and 6 showing a modification thereof, and Figure 9 is an exploded view similar to Figure 5 and showing a still further modification thereof.

As shown in Figures 1 to 3 of the drawings, a vehicle disc brake comprises a rotatable disc 1, a non-rotatable housing 2 straddling the outer periphery of the disc and covering a minor portion of the braking surfaces thereof, and a piston and cylinder mechanism 3 associated with each of the limbs 4, 5 of the housing 2 and operable to force an associated friction pad 6 into frictional engagement with adjacent sides of the disc 1.

The housing 2 comprises a flat-sided oblate base plate 7 having a closed slot 8 formed longitudinally therethrough, the slot 8 being of such dimensions that when the housing 2 is secured to a non-rotatable portion of a vehicle the periphery of the disc passes freely through the slot 8 and the base plate 7 lies on a chord of the disc 1 with the boundary edges of the slot 8 lying respectively adjacent the periphery and opposite radial sides of the disc. On one side of the disc 1, the base plate has a plate 9 secured thereto, extending radially-inwardly of the disc 1, and this plate has ears 10 formed thereon so that it may be secured to the non-rotatable portion of the vehicle, such as to a flange 11 (Figure 2) on the front stub axle 12 by bolts 13. The housing 2 may similarly be secured to a similar flange on the rear axle housing (not shown).

The disc 1 has an annular portion 14 axially offset from its outer peripheral annular braking portion 15; and the offset portion 14 merges into an inner peripheral flange 16 whereby the disc 1 is adapted to be secured to a radial flange 17 on the wheel hub 18 by bolts 19. The body portion 20 of a vehicle wheel is also secured to the flange 17 and the hub 18 is journalled on bearings 21 to rotate around the stub axle 12, the disc 1 rotating with the wheel. In the case of a rear wheel, the hub 18 will be keyed to the end of the half shaft in the known manner.

The limbs 4, 5 of the housing 2 are of substantially rectangular box-section with the opposite sides 22 and 23 extending radially parallel to the braking surfaces 15 of the disc 1 and substantially radially-co-extensive therewith. The inner sides 22 are secured to the longitudinal edges of the slot 8 and the outer sides 23 are secured to the outer longitudinal edges of the base plate 7 which, as is more clearly shown in Figure 2, has its opposite limbs lying between the sides 22 and 23 and in abutment with the radially-inner sides 24 of the respective limbs 4 and 5. The fourth wall of each box-like structure comprises the radially-outer side 25. Further detailed reference to the limbs 4, 5 will be made later in this description.

Located within each of the box-like structures, and free to move axially in the spaces bounded by the sides 22, 23, 24 and 25, is a pressure plate 26 which comprises an elongated channel member having its web portion 27 disposed parallel to the disc 1 and to the sides 22 and 23 of the limbs 4 and 5 and its opposite limbs 28 and 29 lying, respectively, adjacent the outer side 25 of each limb 4 and 5 and adjacent the base plate 7. A lug 30 is turned down from each limb 29 and is located in a rectangular slot 31 in each side of the base plate 7. This slot and lug serve to locate the pressure plates against longitudinal displacement from within the limbs 4 and 5 and provide means whereby the pressure plates may slide axially towards and away from the disc 1, as will later be described.

The sides 24 of the limbs 4 and 5 are unbroken and lie in full abutment with the base plate 7. The sides 23 are turned around the outer edges of the base plate 7 and extend radially-outwardly parallel with the disc 1 for a distance slightly in excess of the combined width of the associated pressure plate 26 and the base plate 7 and are then turned at right angles towards the disc 1 to form the radially-outer side 25. Centrally of each side 23 is formed a circular aperture 32 in which is locked, as by a circular spring clip 33 the cylinder 34 of the piston and cylinder mechanism 3.

Each radially-outer side 25 of the limbs 4, 5 extends unbrokenly towards the disc 1 for a distance slightly less than the axial width of the inner side 24 and is then bifurcated to form a pair of ears 35 separated by a recess 36 which is slightly wider in a circumferential direction than the equivalent dimension of the friction pads 6. The ears 35 extend axially towards the disc 1 and are then turned radially-outwardly at right angles into abutment with the adjacent face of the axially-inner sides 22 of the limbs 4, 5.

Each axially inner wall 22 is turned around the longitudinal edge of the slot 8 and then extends outwardly adjacent a radial braking surface 15 of the disc 1. The side 22 is unbroken for a short distance outwardly of the base plate 7 and is then bifurcated to form two parallel ears 37 which extend into abutment with the parallel portions of the ears 35 of the outer side 25. Where the side 22 is bifurcated a ledge 38 is formed, and this ledge 38 serves as a support and guide for the radially-inner edge of a friction pad 6 when this is inserted.

A distance piece 39 is inserted between each pair of ears 37, and the respective abutting ears 35, 37 on both sides of the disc 1 are secured together by a bolt 40 passed through an ear 35, an ear 37, a distance piece 39, an ear 37 and an ear 35. The limbs 4 and 5 are thus secured together adjacent the outer peripherey of the disc 1 with the ledges 38 and ears 37 forming guides for the friction pads 6 which are inserted through the recesses 36 radially of the disc 1, between the ears 37 until their radially-inner edges rest on the ledges 38 and they are prevented from further radially-inward movement. They are prevented from radially-outer dislodgement by retainers 41 secured to the outer sides 25 of the housing and having lips 42 which engage the radially-outer edges of the pads 6.

Opposite ends of the pressure plates 26 are linked by cylindrical pins 43 which pass loosely through the webs 27, and upon each of these pins 43 between the pressure plates 26, are located two helical compression springs 44 which are separated from each other by a pin 45 passed diametrically through each pin 43. The springs 44 serve as retraction springs to urge the pressure plates 26 towards the respective limbs 4, 5 and away from the disc 1.

Located inwardly of the pins 43 in the pressure plates 26 are the automatic adjusting means which each comprises a pin 46 which is passed through co-axial holes in the webs 27 of the respective pressure plates 26 adjacent, and inwardly of, the pins 44. Each pin 46 comprises an enlarged head 47 and a cylindrical shank 48. The pin 46 is passed through the hole in one web 27 so that the head 47 abuts its axially-outer surface and is substantially-rigidly secured in that position by a spring clip 49, i.e., it has no axial movement therein but has a very slight radial movement sufficient to keep it aligned with the hole 54 in the opposite pressure plate. The shank 48 of the pin extends freely through a co-axial hole 54 in the web 27 of the other pressure plate 26 which, on the inner side thereof, i.e., the side lying adjacent the disc 1, has a tab 50 held thereagainst by a curved portion 51 (Figure 4) which is passed between the adjacent surface of the web 27 and the bar of a staple 52 secured to the base 27. The tab 50 is rectangular in shape and is pivotable towards, or away from the base 28.

The curved portion 51 of the tab 50 is so related to the staple 52 that when the flat portion of the tab 50 is in abutment with the adjacent surface of the web 27 the curved portion 51 is pressing against the bar of the staple 52 with a very slight resilient force sufficient that when the flat end of the tab is released to find its natural position it will move very slightly out of abutment with the web 27. This bias is of a very low order, and its purpose will be apparent hereunder.

The end of the tab 50 remote from the staple 52 has a hole 53 (Figures 5, 6) formed therethrough, and the shank 48 of the pin 46 is passed through the hole 53 before passing through the hole 54 in the web 27. The hole 53 is countersunk from both sides as at 55, 56 and the shank 48 of the pin 46 is a neat sliding fit through the cylindrical portion of the hole 53 and is freely slidable in the hole 54 in the web 27.

The diameter of the hole 53 and the bias on the tab 50 exerted by the bar of the staple 52 on the curved portion 51 of the tab are such that when the tab 50 lies at its angle of rest relative to the pressure plate 26, the pin 46, which is rigidly secured to the other pressure plate 26, can only pass through the holes 53 and 54 by moving the tab 50 into abutment with the web 27 as is shown in Figures 5 and 6 or 7 and 8. When this occurs, the holes 53 and 54 are co-axially aligned and the two pressure plates 26 can move towards each other. As soon as they tend to move apart, however the bias on the tab 50 causes the holes 53, 54 to be moved out of co-axial alignment and the edges of the hole 53 grip the shank 48 at the diametrically-opposed axially-spaced points 57 and 58 (Figure 6) and prevent the pin 46 from being withdrawn from the hole 53. Some amount of additional bias is exerted by the retraction springs 44, and this is sufficient to cause the tab 50 to pivot between the staple 52 and the web 27 until the points 57, 58 actually jam on the shank 48. In this condition the pads 6 are separated from the disc 1 by their normal clearances 59 (Figure 3), which is normally of the order of 0.005" to 0.010".

The piston and cylinder mechanism 3 (Figure 2) comprises a piston 60 fluid-tightly slidable in the cylinder 34 under the influence of fluid-pressure admitted to a space 61 within the cylinder by actuation of a master-cylinder or the like in the known manner. One piston and cylinder mechanism is associated with each of the limbs 4 and 5. Each piston has an extension 62 which has its axially-outer end in abutment with the web 27 of the associated pressure plate 26 on the side thereof opposite the associated friction pad 6, and when fluid-pressure is admitted to the space 61 the pistons 60 press the pressure plates 26 towards each other and so force the friction pads 6 into frictional contact with the braking surfaces 15 of the disc 1.

As the pressure plates 26 move towards each other the springs 44 are compressed and the pins 46 are moved in the holes 54 in the pressure plate 26 to which the tabs 50 are pivoted. The jamming engagement of the points 58, 59 with the shank 48 of the pin 46 causes the tab 50 to pivot towards the web 27, and if the clearances 59 are correct, the pads 6 will be in full engagement with the disc 1 just as the points 58, 59 release the shank 48 and the holes 53, 54 become co-axial. Upon release of the fluid-pressure, the springs 44 will press the pressure plates and pads away from the disc until the clearances 59 are substantially regained. If the pads 6 have been engaged heavily, or for an extended period, there may have been some slight wear of the pads while the brake was engaged, and in such a case the holes 53, 54 being in co-axial alignment and the shank 48 of the pin 46 being free to slide in the co-axial holes 53, 54, the pressure plates 26 will move together as the wear takes place and the pins 46 will move in the holes 53, 54 as the pressure plates move together. Regardless of this, however, as soon as the springs 44 begin to move the pressure plates 26 apart as the brake is released, the bias on the tabs 50 causes them to pivot to frictionally engage the shanks 48 and as the pressure plates continue to move, the points 57, 58 jam on the pins 46 and the tabs pivot until the clearances 59 are regained. If the brake is initially out of adjustment as after fitting new pads 6, and the clearances 59 are excessive the first application of the brake will cause the pins 46 to move in the holes 53, 54 as seen above, and after this initial application the clearances will then be automatically maintained.

A hand-operated mechanism is associated with the brake, and this comprises a bifurcated actuator 64 (Figures 1 and 3) having an elongated flat base 65 and a pair of parallel ears 66 upstanding from the base 65 and offset towards one end thereof. Towards the end of the base 65 remote from the ears 66 a doubly-countersunk hole 67 is formed and this hole 67 conforms precisely with the holes 53 in the tab 50. The hole 67 is passed onto the end of the shank 48 of the pin 46 so that the actuator 64 lies on the opposite side of the web 27 of the pressure plate 26 from the tab 50. Between the pin 46 and the pin 43 a fulcrum bracket 68 is secured to the web 27 and a bell-crank member 69 has its central fulcrum 70 pivoted on a pin 71 passed through slotted holes 71a in the ears 66 of the bifurcated actuator 64. The short arm 72 of the bell-crank 69 is pivoted on a pin 73 passed through holes in the bell-crank 69 and the fulcrum bracket 68 and the long arm 74 of the bell crank 69 extends adjacent the side of the housing 2 and is adapted to have secured thereto an operating rod or cable (not shown) which is attached to a hand lever or other suitable manual operating means in the known way.

When the lever 69 is rotated in a clockwise direction as shown in Figure 3, the lower end of the actuator 64 lags behind the pivot 71 and jams on the pin 46 as in the case of the tabs 50. Further movement of the lever 69 then causes it to rotate on the pivot 73 drawing the pin 46 through the holes 54 and pivoting the tab 50 towards the web 27 and the slotted holes 71a permitting relative movement between the actuator 64 and the pivot 71 to maintain a directly-axial pull on the pin 46. The resistance of the springs 44 also causes the lever 69 to exert a reactive pressure on the fulcrum bracket 68 and this causes the pressure plate 26 to which it is secured to be pressed towards the disc 1. The two pressure plates are thus pressed angularly toward the disc and the brake is manually applied. The tab 50 will operate to adjust the brake for pad wear in the same manner as described hereabove. When the lever 69 is released, the springs 44 will separate the pressure plates 26, the tab 50 will move to its angular position as in Figure 6 and the actuator 64 will move to the position shown in Figure 3 with the hole 67 and the pin 46 co-axial and relatively slidable.

One pin 46 and one tab 50 are located at each end of the pressure plates 26 so that upon actuation of the piston and cylinder device the pressure plates 26 and pads 6 move axially and substantially-parallelly towards the disc 1. The manually-operated means are associated with the pin 46 at one end only of the pressure plates 26, so that upon manual operation of the brake the pressure plates 26 and pads 6 move angularly towards the disc 1, the holes in the pressure plate webs 27 through which the pins 43 and 46 are passed providing sufficient clearance for this angular movement.

As shown in Figures 7, 8 and 9, resilient means may be associated with each tab 50 to give it a positive resilient bias to its jamming position.

In Figures 7 and 8, this resilient means is shown to comprise a light helical compression spring 75 located in recesses 76 formed in co-axial alignment in adjacent faces of the web 27 and the tab 50 at a suitable position adjacent the holes 53, 54. This spring will exert a positive resilient bias to urge the tab 50 pivotally away from the web 27 immediately the brake-engaging pressure is released.

Alternative positive bias may, as shown in Figure 9, be provided by a leaf spring 77 secured to the web 27 by screws 78 and prevented from angular movement by a peg 79 screwed in the web 27 and engaging in a hole 80 in the leaf spring 77. The leaf spring 77 has a permanent "set" away from the web 27 so that when the tab 50 is secured against the web 27 by the staple 52 its lower end is normally urged away from the web 27 as in the case of the modification of Figures 7 and 8.

Having now described my invention, what I claim is:

1. A disc brake comprising a rotatable disc, a housing non-rotatably associated with said disc, a pair of pressure plates associated with said housing and located one on each side of said disc, a friction member associated with each said pressure plate, brake-applying means operable to move said pressure plates in said housing to force said friction members into frictional engagement with opposite sides of said disc, said spring means to withdraw said pressure plates away from said disc upon release of said brake-applying means, a connecting member secured to one said pressure plate and having a sliding engagement with the other pressure plate and a tab member having a pivotal engagement with said other pressure plate and having an edge contacting said connecting member to permit said connecting member to slide freely thereon when said pressure plates move toward said disc and to swing and jam on said connecting member when said pressure plates move away from said disc to limit the extent of said last-named movement.

2. A disc brake according to claim 1 wherein said housing comprises a base member adapted to straddle opposite sides and opposite peripheral portions of said disc on a chord thereof and said pressure plates are partly enclosed in said housing and extend adjacent opposite radial faces of said disc on a lesser chord thereof parallel with the first-named said chord, the opposite ends of said pressure plates extending beyond the periphery of said disc and each of said ends having associated therewith one said connecting member and one said tab member.

3. A disc brake according to claim 1 wherein said connecting member comprises a cylindrical pin having an enlarged head at one end thereof secured to said one pressure plate and having a cylindrical smooth shank portion freely slidable in an aperture in said other pressure plate externally of the periphery of said disc.

4. A disc brake according to claim 1, wherein said tab member has an aperture adjacent one end thereof, said connecting member being adapted to slide in said aperture with light frictional engagement therewith when said connecting member and said apertures are in co-axial alignment and said connecting member being adapted to jam in said aperture when said tab member is pivoted to move said aperture out of co-axial alignment therewith.

5. A disc brake according to claim 4 wherein said tab member is adapted to be pivoted toward said other pressure plate to bring said connecting member and said aperture into co-axial alignment upon movement of said pressure plates towards said disc.

6. A disc brake according to claim 1 wherein said brake-applying means comprises a piston and cylinder mechanism associated with each side of said housing, each said piston being operatively associated with one of said pressure plates.

7. A disc brake according to claim 1 wherein said connecting member at one end of said housing extends through said pressure plate into association with manually-operated means for applying said brake, said manually-operated means comprising a cranked member having one end pivoted to said other pressure plate on the side thereof remote from said disc, a gripping member pivoted to said cranked-member intermediate its ends and having an aperture therein through which said connecting member is adapted to slide with light frictional engagement when said aperture therein and said connecting member are co-axially aligned, said gripping member being adapted to be pivoted to move said aperture out of co-axial alignment with said connecting member upon actuation of said manually-operated means to apply said brake, whereby said gripping member grips said connecting member to slide said connecting member and pivot said tab member towards said other pressure plate and to draw said pressure plates inwardly towards said disc.

8. A disc brake according to claim 1 wherein said friction members comprise pads of friction material adapted to be inserted in said housing radially of said disc through an aperture in said housing.

9. A disc brake according to claim 8 comprising means to support said friction pads against circumferential displacement in said housing.

10. A disc brake according to claim 8 comprising means to support said friction pads against radial displacement in said housing.

11. The disc brake of claim 1 wherein said tab member has an aperture and in which said connecting member extends through said aperture and is slidable therein when said aperture and connecting member are in coaxial alignment.

12. A device according to claim 11, wherein said movement of said pressure plates away from said disc causes a jamming engagement between said connecting member and portions of the periphery of said aperture in said tab member.

13. A device according to claim 12 wherein the jamming of said portions of said aperture on said connecting member is adapted to restrict the movement of said pressure plates away from said disc to the amount determined by said pivotal movement.

14. A device according to claim 12, wherein said connecting member comprises a portion of a manually-operated brake-applying mechanism.

15. A device according to claim 14, wherein said connecting member is adapted to extend outwardly of said aperture in said other pressure plate and to be passed through an aperture in a bracket pivoted in a pivoted member comprising said manually-operated mechanism, said connecting member being adapted to slide with light frictional engagement in the aperture in said bracket when said connecting member and said aperture are in co-axial alignment and to jam in said aperture when said aperture is tilted out of said co-axial alignment, whereby pivotal movement of said pivoted member is adapted to draw said connecting member axially in the aperture in said other pressure plate and to cause said pressure plates to move towards said disc, thereby pivoting said tab member towards said other pressure plate.

16. A device according to claim 11 comprising resilient means adapted to urge said tab member into pivotal movement away from said other pressure plate.

References Cited in the file of this patent

UNITED STATES PATENTS

| 1,944,116 | Stratman | Jan. 16, 1934 |
| 2,152,669 | Shelor | Apr. 4, 1939 |
| 2,384,297 | Goepfrich | Sept. 4, 1945 |
| 2,663,384 | Chamberlain | Dec. 22, 1953 |
| 2,762,461 | Naumann | Sept. 11, 1956 |

FOREIGN PATENTS

| 761,479 | Great Britain | Nov. 14, 1956 |